(12) United States Patent
Craemer et al.

(10) Patent No.: US 7,937,237 B2
(45) Date of Patent: May 3, 2011

(54) METHOD FOR RECOGNIZING A SENSOR TYPE

(75) Inventors: Ulrich Craemer, Celle (DE); Hartmut Wolpert, Zeitlarn (DE); Christian Zobel, Wolfsegg (DE)

(73) Assignee: Continental Automotive GmbH, Hannover (DE)

( * ) Notice: Subject to any disclaimer, the term of this patent is extended or adjusted under 35 U.S.C. 154(b) by 447 days.

(21) Appl. No.: 10/599,438

(22) PCT Filed: Feb. 1, 2005

(86) PCT No.: PCT/EP2005/050426
§ 371 (c)(1),
(2), (4) Date: Feb. 27, 2008

(87) PCT Pub. No.: WO2005/088261
PCT Pub. Date: Sep. 22, 2005

(65) Prior Publication Data
US 2008/0215296 A1 Sep. 4, 2008

(30) Foreign Application Priority Data
Mar. 10, 2004 (DE) .................. 10 2004 011 698

(51) Int. Cl.
*G01C 25/00* (2006.01)
(52) U.S. Cl. ........... 702/116; 702/57; 702/127; 702/189
(58) Field of Classification Search .............. 702/1, 33, 702/57, 73, 90, 91, 104, 127, 183, 187, 189, 702/193, 198
See application file for complete search history.

(56) References Cited

U.S. PATENT DOCUMENTS

| 5,397,924 | A | * | 3/1995 | Gee et al. ................. 307/9.1 |
| 5,739,592 | A | * | 4/1998 | Rigsby et al. .............. 307/9.1 |
| 5,754,963 | A | * | 5/1998 | Nunneley et al. ........... 701/34 |
| 5,982,290 | A | * | 11/1999 | Berger et al. .............. 340/618 |
| 6,016,465 | A | * | 1/2000 | Kelly ..................... 702/116 |
| 6,076,504 | A | * | 6/2000 | Stavnheim et al. ......... 123/447 |
| 6,111,530 | A | * | 8/2000 | Yun ....................... 341/137 |
| 6,115,654 | A | * | 9/2000 | Eid et al. .................. 701/34 |
| 6,421,625 | B1 |  | 7/2002 | Cianciara et al. .......... 702/130 |
| 6,633,828 | B2 | * | 10/2003 | Faymon et al. ............ 702/146 |

(Continued)

FOREIGN PATENT DOCUMENTS
DE  39 21 962 C2  3/1992
(Continued)

OTHER PUBLICATIONS

International Search Report and Written Opinion for International Application No. PCT/EP2005/050426 (4 pages), Aug. 22, 2005.

*Primary Examiner* — Jonathan C Teixeira Moffat
(74) *Attorney, Agent, or Firm* — King & Spalding L.L.P.

(57) ABSTRACT

A first condition, which is met when a measuring signal (V_SENS) of a sensor exceeds a first threshold value (V_SW), is checked. A second condition, which is met when a gradient (GRD_V_SENS) of a measuring signal (V_SENS) is greater than a predefined second threshold (GRD_V_SW), is checked. If the first and second conditions are met, this is recognized on a sensor with a signal evaluation area multiplex output for the measuring signal. If at least one of the conditions is not met, this is recognized on a sensor without a signal evaluation area-multiplex output for the measuring signal.

15 Claims, 3 Drawing Sheets

U.S. PATENT DOCUMENTS

| | | | |
|---|---|---|---|
| 7,021,117 B2 * | 4/2006 | Cho | 73/1.73 |
| 7,123,021 B2 | 10/2006 | Przymusinski et al. | 324/537 |
| 2003/0136173 A1 * | 7/2003 | Elenich et al. | 73/1.73 |
| 2003/0225505 A1 * | 12/2003 | Yook | 701/114 |
| 2004/0158435 A1 * | 8/2004 | Slates et al. | 702/185 |

FOREIGN PATENT DOCUMENTS

| | | |
|---|---|---|
| DE | 297 21 751 U1 | 5/1998 |
| DE | 19907950 A1 | 9/2000 |
| DE | 198 47 841 C2 | 8/2002 |
| EP | 0985915 A2 | 3/2000 |

* cited by examiner

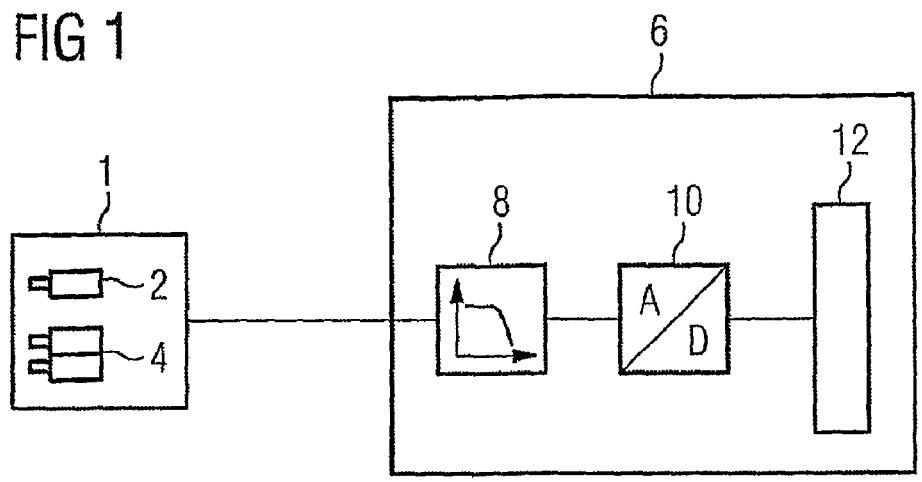
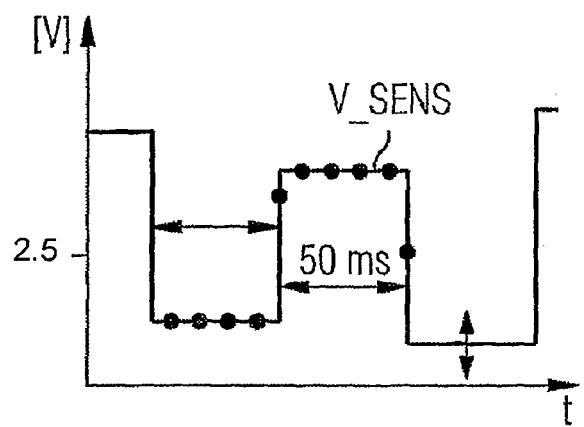
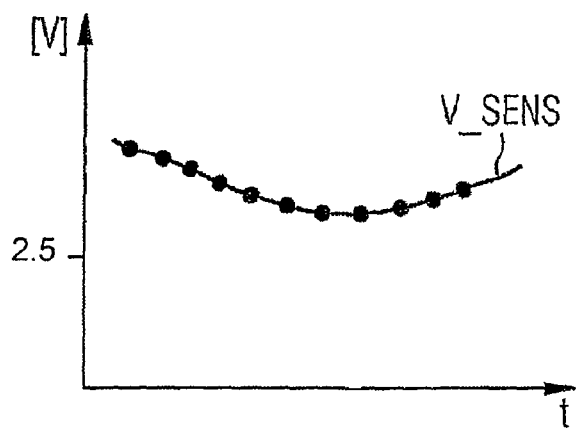

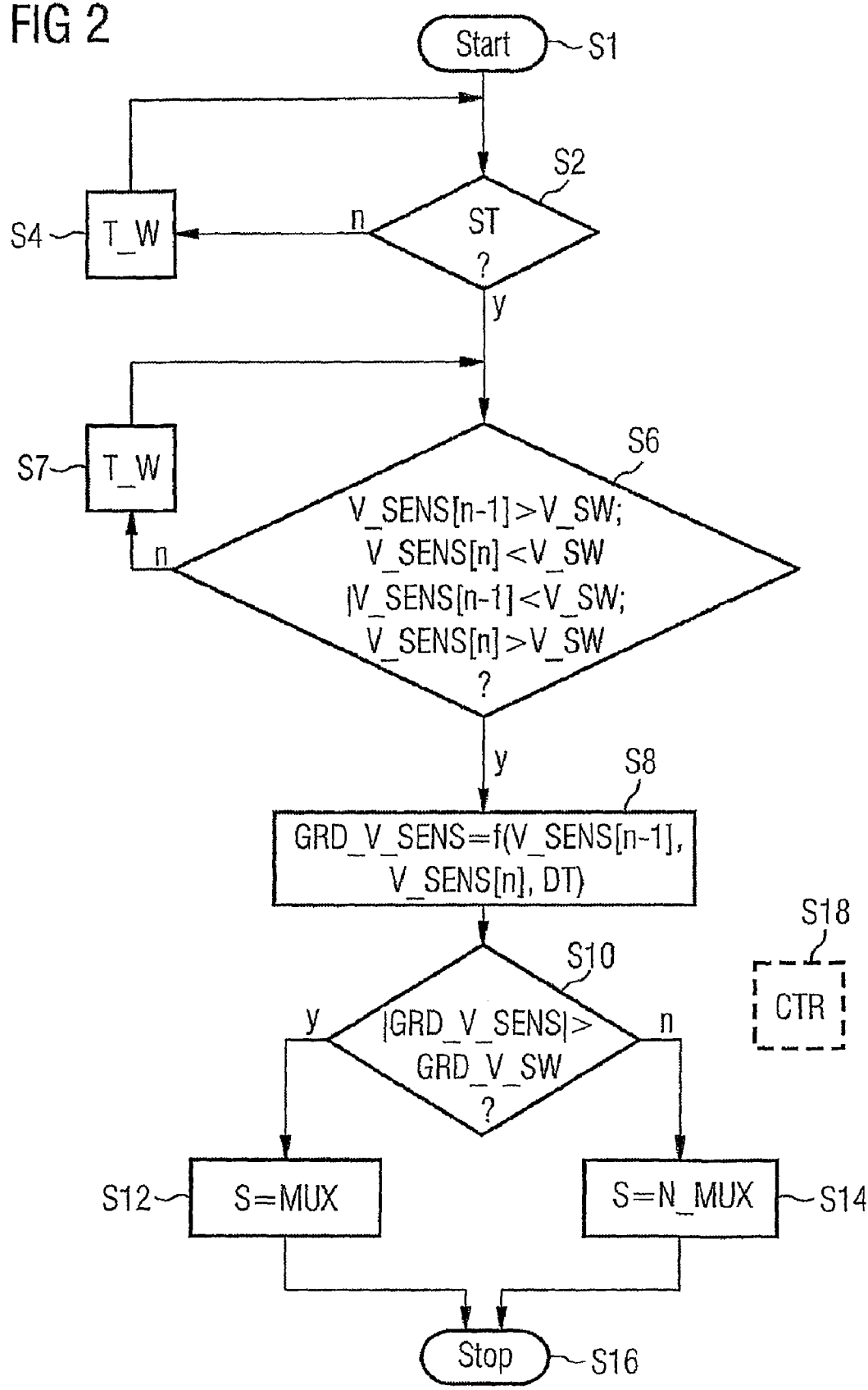

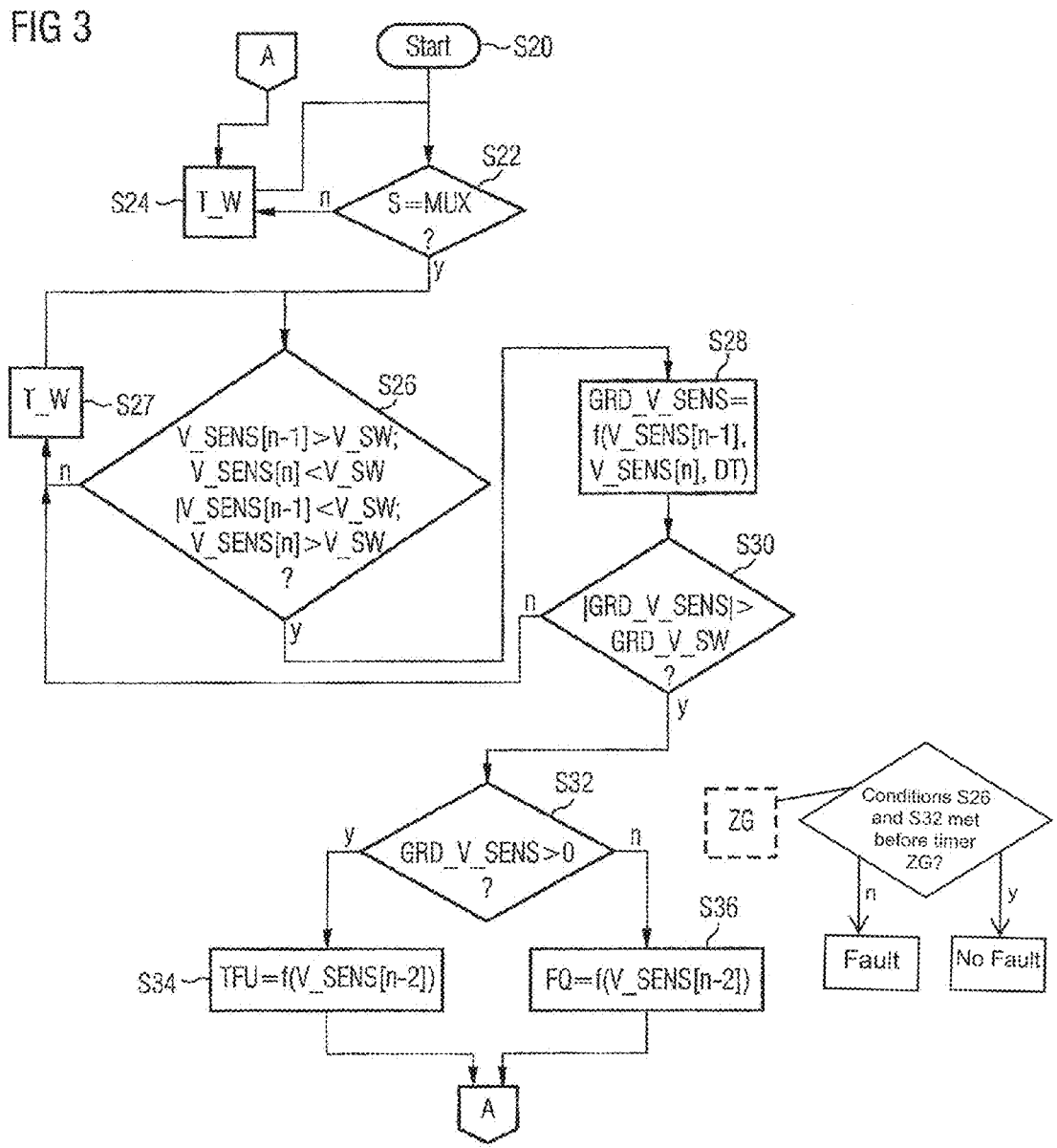

US 7,937,237 B2

METHOD FOR RECOGNIZING A SENSOR TYPE

CROSS-REFERENCE TO RELATED APPLICATIONS

This application is a U.S. national stage application of International Application No. PCT/EP2005/050426 filed Feb. 1, 2005, which designates the United States of America, and claims priority to German application number DE 10 2004 011 698.9 filed Mar. 10, 2004, the contents of which are hereby incorporated by reference in their entirety.

TECHNICAL FIELD

The invention relates to a method for recognizing a sensor type. Technical devices, in particular motor vehicles, have a large and constantly increasing number of sensors whose measuring signals are evaluated in one or more control devices.

BACKGROUND

The number of inputs of the control devices via which, for example, the curve of the measuring signal generated by the respective sensor can be registered and sampled by means of an analog/digital converter is, however, limited. For increasing the possible number of registered measuring signals, multiplexers are known which, for example, time-multiplex two sensors' measuring signals which can then be sampled via an input and an analog/digital converter assigned thereto and are then, where applicable, digitally demultiplexed.

One possibility of multiplexing in the case of analog sensor measuring signals is to assign the measuring signals of two sensors, for example a fuel-temperature sensor and fuel-quality sensor, different signal-value ranges.

SUMMARY

The object of the invention is to provide a method by means of which a sensor type can be recognized simply.

The invention is characterized by a method having the following steps for recognizing a sensor type. A first condition is checked that will have been met if a sensor's measuring signal exceeds a first threshold. A second condition will be checked if the first has been met. The second condition will have been met if a gradient of the measuring signal is greater in amount than a predefined second threshold. If both the first and second condition have been met, then a sensor having a signal-value-range multiplex output for the measuring signal will be recognized. If at least one of the conditions has not been met, then a sensor not having a signal-value-range multiplex output for the measuring signal will be recognized.

The respective sensor type can in this way be reliably recognized without the need for additional hardware therefor.

In an advantageous embodiment of the invention the first and second condition are in each case checked close in time to the start of the sensor's operation. It can in this way be ensured that the measuring signal will be correctly assigned close in time to the start of the sensor's operation.

In a further advantageous embodiment of the invention the sensor having the signal-value-range multiplex output for the measuring signal will be recognized when the first and second condition have been met a predefined number of times, preferably, moreover, within a predefinable period of time. The sensor not having a signal-value-range multiplex output for the measuring signal will otherwise be recognized. It can in this way be ensured that the sensor type will be recognized extremely reliably.

In a further advantageous embodiment of the invention the following steps are performed in the case of a recognized sensor having a signal-value-range multiplex output. The first and, dependent thereon, the second condition are checked. A measurement value of the measuring signal, which value was registered a predefined period of time before the first and second condition were met, will be assigned to either a first or a second measured variable, and as a function, moreover, of the sign of the measuring signal's gradient or as a function of the measurement value's absolute value. A high quality can in this way be ensured when the measured variable is registered, in particular when there is a low-pass filter.

In a further advantageous embodiment of the invention a fault will be recognized if the first and second conditions are not met within a predefinable period of time. It can in this way be ensured in a simple manner that possibly obsolete measurement values are not taken as the basis for further measurement-value processing.

BRIEF DESCRIPTION OF THE DRAWINGS

Exemplary embodiments of the invention are explained below with the aid of the schematics.

FIG. 1 shows an arrangement of a sensor 1 and of a control device 6,

FIG. 2 is a flowchart of a program for recognizing a sensor type,

FIG. 3 is a further flowchart of a program that assigns measurement values as a function of a recognized sensor type, and FIGS. 4a and 4b show example outputs of sensors.

Elements having the same design or function have been assigned the same reference numerals in all the Figures.

DETAILED DESCRIPTION

A sensor 1 can be a sensor 2 not having a signal-value-range multiplex output or a sensor 4 having a signal-value-range multiplex output. Shown by way of example in FIG. 4a is a time curve of a measuring signal V_SENS for the sensor 4 having a signal-value-range multiplex output. FIG. 4b shows the time curve of the measuring signal V_SENS of the sensor 2 not having a signal-value-range multiplex output, with in each case the abscissa being the time t and the ordinate a voltage V.

The sensor 1 can be any sensor but is preferably a fuel-temperature sensor and/or a fuel-quality sensor. The sensor 2 not having a signal-value-range multiplex output is, for example, either the fuel-temperature sensor or the fuel-quality sensor. The sensor 4 having a signal-value-range multiplex output is preferably both the fuel-temperature sensor and the fuel-quality sensor. The measuring principle of the fuel-temperature sensor is preferably a resistance-measuring principle while the measuring principle of the fuel-quality sensor is preferably a capacitive measuring principle.

The sensor 1 is coupled to a control device 6 in such a way that the measuring signal V_SENS is conveyed to the control device 6. The sensor 1 is preferably connected in an electrically conducting manner to the sensor device 6.

The measuring signal V_SENS of the sensor 1 is filtered on the input side of the control device 6 preferably by means of a low-pass filter 8. The filtered measuring signal is then converted in an analog/digital converter 10 at each sampling instant into a digital measurement value. The measuring signal is then processed in the processing unit 12. Programs that are explained in more detail below with the aid of FIGS. 2 and 3 are for this purpose processed in the processing unit 12.

A program for recognizing a sensor type (FIG. 2) is started at a step S1 at which, where applicable, variables are initialized. The program is started preferably close in time to a start of operation of the sensor 1. In the case of a sensor assigned to the control device 6, if said control device 6 has been provided for controlling a vehicle's internal combustion engine, a check is then carried out at a step S2 to determine whether a start ST of the internal combustion engine has just taken place. That can be done by, for instance, evaluating a start signal generated, for example, when an ignition key is turned. If the condition of step S2 has not been met, then the program will be halted at a step S4 for a predefined waiting time T_W before the condition of step S2 is checked again. The program can alternatively then also be terminated.

If, conversely, the condition of step S2 has been met, then a check will be carried out at a step S6 to determine whether the measuring signal V_SENS [n−1] of the preceding sampling instant is greater than a first threshold. The measuring signal V_SENS preferably has a value range of 0 to 5 V. The first threshold V_SW has, for example, the value 2.5 V. A term in square brackets always identifies the respective sampling instant. Thus n identifies the current sampling instant, n−1 the sampling instant a sampling period DT before, and n−2 a sampling instant two sampling periods DT before.

A check is also carried out to determine whether the current measuring signal V_SENS [n] is smaller than the first threshold V_SW. If both are the case, then the condition, referred to below also as the first condition, of step S6 will have been met. A check is additionally carried out at step S6 to determine whether the measuring signal V_SENS [n−1] sampled during the preceding sampling period is smaller than the first threshold V_SW and whether the current measuring signal V_SENS [n] is greater than the first threshold V_SW. The first condition will have been met when this has been met also.

If the condition of step S6 has not been met, then processing will be continued at a step S7 at which the program is halted for the predefined waiting time T_W before the condition of step S6 is checked again. It can, where applicable, also be provided for the program to be continued at a step S14 if the condition of step S6 has not been met a predefinable number of times. Said predefinable number has advantageously been selected such that in the case of a sensor having a signal-value-range multiplex output the condition of step S6 will have been met at least once within the period of time resulting from multiplying the predefined number by the predefined waiting time T_W.

If, conversely, the condition of step S6 has been met, then a gradient GRD_V_SENS of the measuring signal V_SENS will be determined at a step S8. That will take place depending on the measuring signal V_SENS [n−1] registered during the preceding sampling period DT, on the current measuring signal V_SENS [n], and on the sampling period DT.

A check is then carried out at a step S10 to determine whether the amount of the gradient GRD_V_SENS of the measuring signal V_SENS is greater than a second threshold GRD_V_SW. The second threshold GRD_V_SW has preferably been selected to be characteristic of an edge of the measuring signal V_SENS when the signal value range is changed over. It has for said purpose been selected as being sufficiently high in amount to be able to ensure that the portion of the measuring signal representing the respective measured variable cannot be subject to fast temporal variations of such kind.

If the condition of step S10 has been met, then a sensor-type variable S will be assigned a multiplex value MUX at a step S12. If, conversely, the condition of step S10 has not been met, then the sensor-type variable S will be assigned a non-multiplex value NMUX. Recognizing of the sensor type is thereby concluded and the program will be terminated at a step S16.

A counter CTR can additionally be provided that will be incremented in each case by a predefined value when both the first condition, which is to say the condition of step S6, and a second condition, which is to say the condition of step S10, have been met. Steps S6 to S10 will then be provided with an additional loop and steps S6 to S10 then executed cyclically for a predefinable period of time. The counter CTR will then be incremented each time the condition of step S10 has been met. Assigning to the sensor-type variable S will then only take place when the counter CTR has exceeded a predefined maximum value.

According to FIG. 3 a program for processing the measuring signal V_SENS of the sensor 4 having a signal-value-range multiplex output is started at a step S20 at which, where applicable, variables are initialized. A check is carried out at a step S22 to determine whether the sensor-type variable S has the multiplex value MUX. If that is not the case, then the program will be halted at a step S24 for the predefined waiting time T_W before the condition of step S22 is checked again.

If, conversely, the condition of step S22 has been met, then the first condition will be checked again at a step S26, as at step S6. If the condition of step S26 has not been met, then processing will be continued at a step S27 at which the program is halted for the predefined waiting time T_W before the condition of step S26 is checked again.

If, conversely, the condition of step S26 has been met, then the gradient GRD_V_SENS of the measuring signal V_SENS will be determined at a step S28 corresponding to step S8. The second condition will then be checked at a step S30 corresponding to step S10. If the condition of step S30 has not been met, then processing will be continued at step S27.

If, conversely, the condition of step S30 has been met, then a check will be carried out at a step S32 to determine whether the gradient GRD_V_SENS of the measuring signal V_SENS is greater than zero. This is to be equated with checking the sign of the gradient GRD_V_SENS of the measuring signal V_SENS. If the condition of step S32 has been met, then a fuel temperature TFU will be assigned the measuring signal V_SENS [n−2] registered two sampling periods DT before. The fuel temperature TFU is thus determined at step S34 as a function of the measuring signal V_SENS [n−2] registered two sampling periods DT before.

If, conversely, the condition of step S32 has not been met, then at a step S36 a fuel quality FQ will be determined as a function of the measuring signal V_SENS [n−2] registered two sampling periods DT before. Depending on the embodiment of the sensor 4 having a signal-value-range multiplex output, steps S34 and S36 can also be changed over. The first threshold V_SW, for example, has in this exemplary embodiment been selected as being 2.5 V. Measuring signals whose value is greater than 2.5 V in this case represent the fuel quality FQ and measuring signals V_SENS whose value is less than 2.5 V represent the fuel temperature TFU. The fuel quality FQ is, for example, characteristic of the portion of water in the fuel or of a portion of rapsmethylester (otherwise known as biodiesel).

The fuel temperature TFU and fuel quality FQ determined at steps S34 and S36 are then made available to further functions in the processing unit 12, for example to a function for determining a duration of injection for fuel in a combustion chamber of a cylinder in the internal combustion engine. Processing is continued again at step S24 following processing at step S34 or S36.

A timer (ZG) is furthermore provided by means of which it is monitored whether the first and second condition are met during a predefinable period of time. If it is recognized by means of said timer (ZG) that the first and second condition are not being met during said predefinable period of time, then a fault in the sensor (1) will be inferred. Suitable measures can then be initiated such as, in the case, for instance, of an internal combustion engine, where applicable, controlling operation under emergency conditions or performing appropriate, modified calculating of other output variables from other functions.

What is claimed is:

1. A method for recognizing a sensor type, the method performed by a program of computer instructions embodied in non-transitory computer-readable media and executable by a processing unit and comprising the following steps:
   Checking, by the processing unit, a first condition that will have been met if a measuring signal of a sensor exceeds a first threshold,
   Checking, by the processing unit, a second condition if the first condition has been met, with the second condition having been met if a gradient of the measuring signal is greater in amount than a predefined second threshold,
   Determining, by the processing unit, whether or not the sensor is a signal-value-range multiplex output type sensor, wherein a signal-value-range multiplex output type sensor comprises a type of sensor that measures at least two different parameters having non-overlapping ranges of signal values and outputs the measurements of the at least two different parameters in a multiplexed manner, including:
   recognizing the sensor as a signal-value-range multiplex output type sensor if the first and second conditions have been met, and
   recognizing the sensor as not a signal-value-range multiplex output type sensor if at least one of the first and second conditions has not been met.

2. The method according to claim 1, wherein the first and second conditions are in each case checked close in time to a start of operation of the sensor.

3. The method according to claim 1, wherein the sensor having the signal-value-range multiplex output for the measuring signal will be recognized if the first and second conditions have been met a predefined number of times, and otherwise the sensor not having a signal-value-range multiplex output for the measuring signal will be recognized.

4. The method according to claim 1, wherein in case of a recognized sensor having a signal-value-range multiplex output:
   a measurement value of the measuring signal, which value was registered a predefinable period of time before the first and second condition were met, will be assigned to either a fuel temperature or a fuel quantity depending on the sign of the gradient of the measuring signal or depending on the measurement value's absolute value.

5. The method according to claim 4, wherein a fault will be recognized if the first and second conditions are not met during a predefinable period of time.

6. A method for determining whether or not a sensor is a signal-value-range multiplex output type sensor, defined as a sensor that measures at least two different parameters having non-overlapping ranges of signal values and outputs the measurements of the at least two different parameters in a multiplexed manner, the method performed by a program of computer instructions embodied in non-transitory computer-readable media and executable by a processing unit and comprising:
   Determining, by the processing unit, whether a measuring signal of the sensor exceeds a first threshold and if so, determining whether a gradient of the measuring signal is greater in amount than a predefined second threshold, and if so, identifying the sensor as a signal-value-range multiplex output type sensor,
   and if either step of determining fails, then identifying the sensor as not being a signal-value-range multiplex output type sensor.

7. The method according to claim 6, wherein the steps of determining are in each case checked close in time to a start of operation of the sensor.

8. The method according to claim 6, wherein the sensor having the signal-value-range multiplex output for the measuring signal will be recognized if the steps of determining have been met a predefined number of times, and otherwise the sensor not having a signal-value-range multiplex output for the measuring signal will be recognized.

9. The method according to claim 6, wherein the following steps are carried out in the case of a recognized sensor having a signal-value-range multiplex output:
   assigning a measurement value of the measuring signal, which value was registered a predefinable period of time before the steps of determining were met, to either a fuel temperature or a fuel quantity depending on the sign of the gradient of the measuring signal or depending on the measurement value's absolute value.

10. The method according to claim 9, wherein a fault will be recognized if the steps of determining are not met during a predefinable period of time.

11. An arrangement for recognizing whether or not a sensor is a signal-value-range multiplex output type sensor, defined as a sensor that measures at least two different parameters having non-overlapping ranges of signal values and outputs the measurements of the at least two different parameters in a multiplexed manner, the arrangement comprising:
   means for determining whether a measuring signal of the sensor exceeds a first threshold and
   means for determining whether a gradient of the measuring signal is greater in amount than a predefined second threshold,
   wherein the sensor is recognized as a signal-value-range multiplex output type sensor if both determinations are met, and if either determination fails, then the sensor is not recognized as a signal-value-range multiplex output type sensor.

12. The arrangement according to claim 11, wherein the determinations are performed close in time to a start of operation of the sensor.

13. The arrangement according to claim 11,
   wherein the sensor having the signal-value-range multiplex output for the measuring signal will be recognized if the determinations have been met a predefined number of times, and otherwise the sensor not having a signal-value-range multiplex output for the measuring signal will be recognized.

14. The arrangement according to claim 11, wherein in the case of a recognized sensor having the signal-value-range multiplex output a measurement value of the measuring signal, which value was registered a predefinable period of time before the determinations were met, is assigned to either a fuel temperature or a fuel quantity depending on the sign of the gradient of the measuring signal or depending on the measurement value's absolute value.

15. The arrangement according to claim 14, wherein a fault will be recognized if the determinations are not met during a predefinable period of time.

* * * * *